United States Patent [19]

Hanscom

[11] 4,400,586
[45] Aug. 23, 1983

[54] REMOTE MESSAGE REPEAT CONTROL FOR TELEPHONE ANSWERING SYSTEM

[75] Inventor: Bradford E. Hanscom, Downey, Calif.

[73] Assignee: T.A.D. Avanti, Inc., Compton, Calif.

[21] Appl. No.: 301,756

[22] Filed: Sep. 14, 1981

[51] Int. Cl.³ .............................................. H04M 1/64
[52] U.S. Cl. ................................ 179/6.11; 179/6.07; 360/74.1
[58] Field of Search ....................... 360/12, 74.1, 74.4; 179/6.07, 6.08, 6.11, 6.1; 369/27

[56] References Cited

U.S. PATENT DOCUMENTS

| | | | |
|---|---|---|---|
| 3,757,049 | 9/1973 | Bonsky | 179/6.11 |
| 3,903,369 | 9/1975 | Darwood | 179/6.11 |
| 4,031,323 | 6/1977 | Ando | 179/6.11 |
| 4,302,630 | 11/1981 | Ingegnoli | 179/6.07 |

*Primary Examiner*—Alan Faber
*Attorney, Agent, or Firm*—Keith D. Beecher

[57] ABSTRACT

A remote repeat message control for a telephone answering system is provided, by which a person may cause his telephone answering system to repeat any message read to him over the telephone line by the system. In order for the user to gain access to and activate his telephone answering system from a remote point to receive the recorded messages, he dials the telephone number of his system and, after the system has answered, and after the announcement has been transmitted to the caller, he transmits a predetermined digital code over the telephone line from a remote control unit. At the end of each message transmitted to the user over the telephone line, a dual tone is transmitted by the telephone answering system to the user. The user can then cause the machine to repeat the previous message by again transmitting the digital code over the telephone line within a predetermined time interval. At the end of the last of the messages the telephone answering system transmits a different number of dual tone signals over the telephone line, and when the user hears these latter tones he can again send the digital code over the line. This latter action causes the message tape of the telephone answering system to return to its origin position, and all previously recorded messages to be erased from the message tape.

3 Claims, 9 Drawing Figures

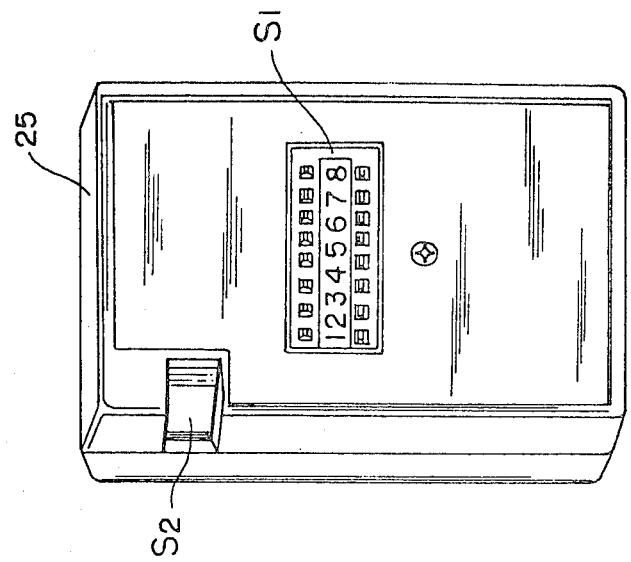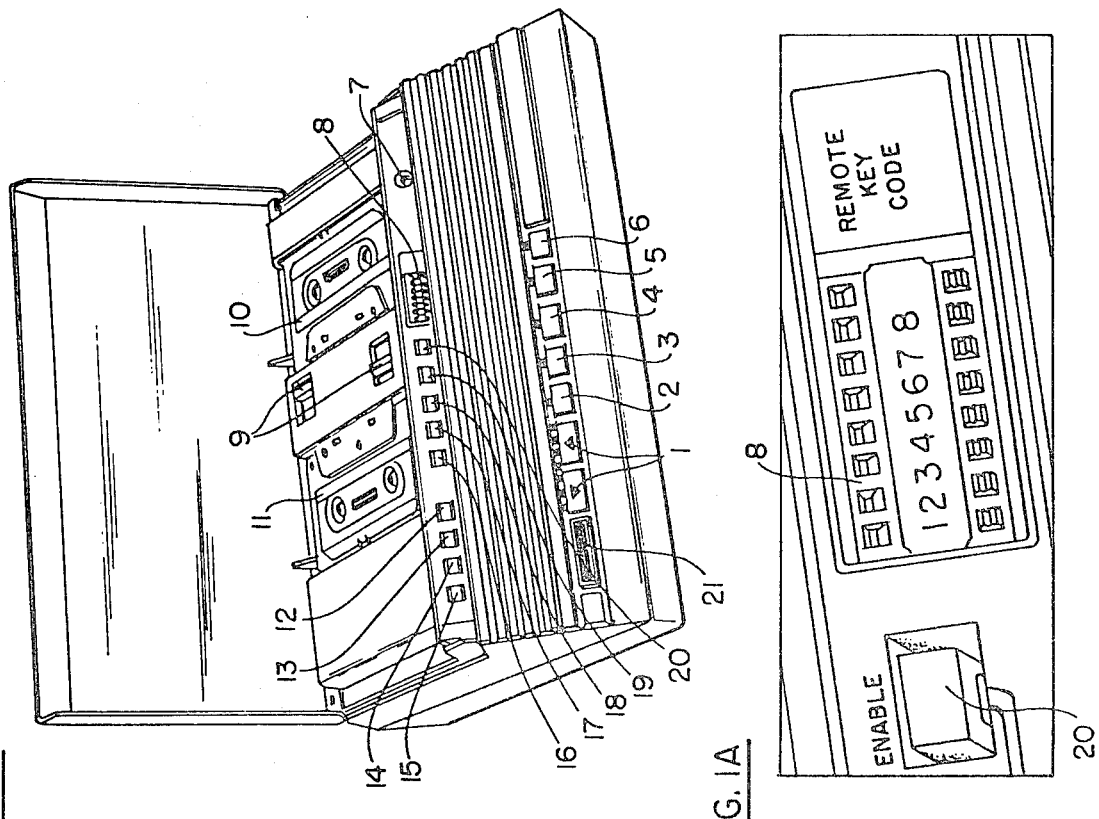

REMOTE MESSAGE REPEAT CONTROL FOR TELEPHONE ANSWERING SYSTEM

RELATED COPENDING APPLICATIONS

Ser. No. 301,740 filed Sept. 14, 1981.

BACKGROUND OF THE INVENTION

Telephone answering systems which may be remotely controlled are described in U.S. Pat. Nos. 3,757,049 and 3,903,369, both of which are assigned to the present assignee. A remotely controlled telephone answering system is also described in the copending application referred to above.

The telephone answering systems described in the patents, as well as the telephone answering system described in the copending application, each includes an announcement tape which is activated during an announcement interval ($T_1$) in response to a telephone call, and which causes a recorded announcement on the announcement tape to be transmitted to the calling party over the telephone line during that interval. At the end of the announcement interval ($T_1$), a message tape is activated, and it records the message from the calling party during an ensuing time interval ($T_2$). The time interval ($T_2$) may be of any predetermined length, or it may continue within the limits of the system, for as long as the calling party is talking (VOX).

The telephone answering systems described in the patents and in the copending application are capable of remote control, which enables the user to call up his machine over the telephone line and to activate the machine to cause it to transmit to him all the accumulated messages previously recorded on the message tape. This is achieved in the systems described in the patents and in the copending application by means of a small portable remote control unit which is held by the user up to the mouthpiece of the telephone, and which is pushbutton controlled to transmit a digitally coded signal including signal tones of predetermined frequencies, over the telephone line.

The present application is also concerned with such a remote control system, and, particularly, with a system which is constructed to incorporate a prompting feature, whereby the caller, merely by again sending the digital code over the telephone line, can cause the machine to repeat the last message, and which also can be used to cause the machine to erase all the previously recorded messages, after all the messages have been read successively to the calling party.

BRIEF DESCRIPTION OF THE DRAWINGS

FIG. 1 is a perspective representation of a telephone answering system which may be remotely controlled, and which incorporates a number of switches which are set to predetermined positions to enable access to the unit only when tone signals are received over the telephone line complying with a predetermined code;

FIG. 1A is a fragmentary enlarged portion of the telephone answering unit shown in FIG. 1, and showing how the code switches may be set to any selected code;

FIG. 2 is a perspective view of a remote control unit for operating the telephone answering unit of FIG. 1, and which includes a like number of coding switches;

DETAILED DESCRIPTION OF THE ILLUSTRATED EMBODIMENT

Figures 3, 6:
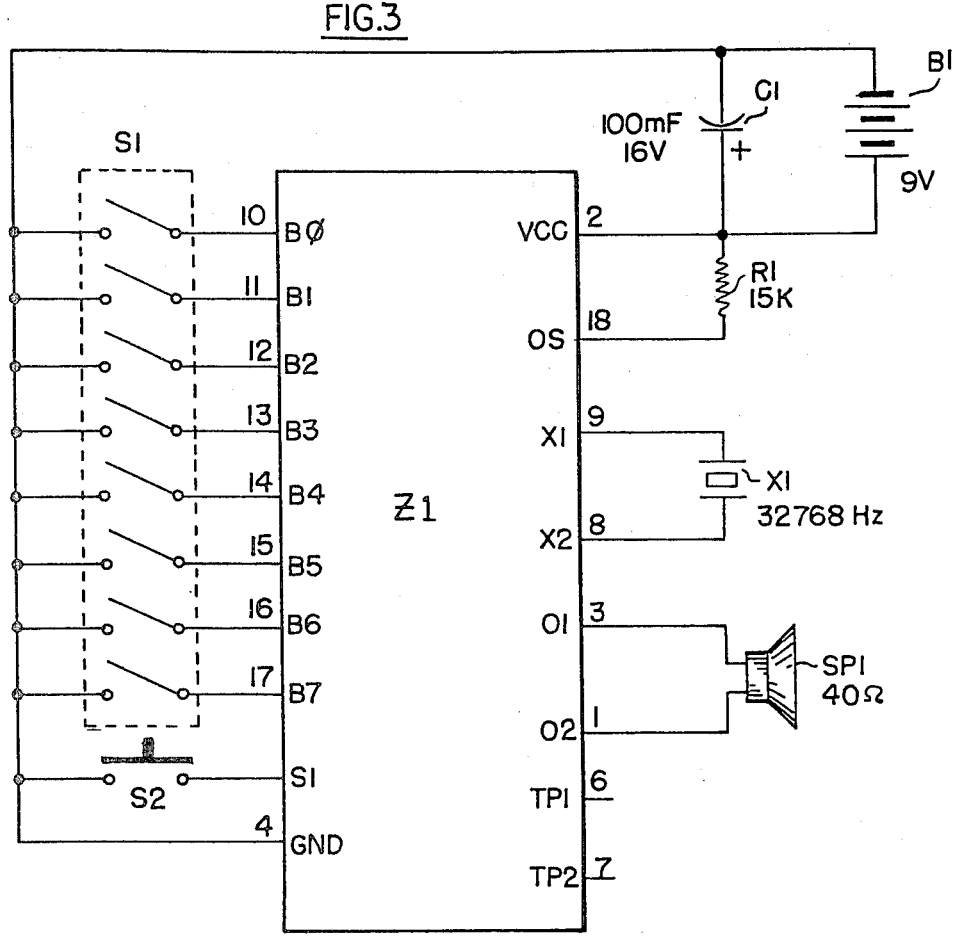
FIG. 3 is a schematic diagram of the electronic circuitry included in the remote control unit of FIG. 2.
FIG. 6 is a representation of the binary coded tone signals transmitted from the control unit of FIG. 2 over the telephone line to the telephone answering system of FIG. 1.

A typical telephone answering system is shown in FIG. 1, and it includes up/down keys 1 which are used to adjust volume; a stop key 2 which is used to suspend any function; a REWIND key 3 which is used to rewind the message tape; and a PLAY key 4 which is used to play back received messages. The system also includes a 2-WAY key 5 which is used to record two-way conversations; and an ANSWER key 6 which is actuated to answer the telephone and take messages.

Also included in the system is a microphone jack 7. A microphone may be plugged into jack 7 to dictate notes on the message tape upon actuation of button 15. The unit also includes a series of code switches 8 which, in the illustrated embodiment are eight in number. The switches 8 may be set to any predetermined code, as shown in FIG. 1A, by operating each individual switch by a pencil, for example, to establish it in either the binary "1" position or in the binary "0" position.

Cassette eject levers 9 are provided to eject either the incoming message cassette 10 or the outgoing announcement cassette 11. A RING SELECT button 12 is provided which is used to select the number of rings to be received before the unit will answer. VOX time buttons 13 and 14 are provided. When button 14 is actuated, a message may be recorded so long as the calling party is speaking, without any time limit. When button 14 is actuated, an incoming message is recorded on the message tape so long as the calling party is speaking, but up to a user programmable limit with a 200 second maximum.

The telephone answering system also includes two announcement buttons 16 and 17. When button 16 is operated, the outgoing announcement may be monitored; and when button 17 is actuated together with an enable button 20, the outgoing announcement may be recorded. Also includes are MESSAGE buttons 18 and 19. When button 18 is actuated together with enable button 20, messages are erased. When the button 19 is actuated, the message tape is scanned at a faster speed than normal. A digital display is also provided, which will be described.

The telephone answering system of FIG. 1 is operated by a remote control unit 25, shown in FIG. 2. The remote control unit 25 includes a number of coding switches S1 corresponding to the switches 8 on the telephone answering unit of FIGS. 1 and 1A, and these switches are set to the same code as the switches of FIG. 1A, to permit access to the unit. Both the switches 8 and S1 may be set by the point of a pencil, as shown in FIG. 1A, or by a similar tool.

When the user wishes to receive by telephone messages recorded on the telephone answering system of FIG. 1, he calls his phone number to cause the telephone answering system to come on the line, and at the end of the announcement he then holds the remote control unit 25 up to the mouthpiece of a telephone, and presses a key S2. This causes the remote control unit to transmit the code shown in FIG. 6 over the telephone line to operate the telephone answering system of FIG. 1, and cause it to transmit over the telephone line all the messages that have been accumulated in the unit.

The electronic circuitry of the remote control unit 25 of FIG. 2, as shown in FIG. 3, includes a custom integrated circuit Z1, and associated circuitry, as indicated. The integrated circuit Z1 is constructed by Silicon Systems Incorporated of Tustin, Calif. and designated by them as Specification No. 17C 265H. The custom integrated circuit contains an oscillator, a 32-bit shift register, word counter, frequency dividers and a digital-to-analog converter (DAC). The control unit is activated when the user pushes the pushbutton S2, grounding the pin S1. Two sequences of thirty-two 31.25 millisecond tone bursts (bits) are generated, with binary "0" being 683 Hz and with binary "1" being 1024 Hz in a constructed embodiment. The bit pattern is as shown in FIG. 6, namely 00000000000000001110, and an 8-bit code set by the user in the positions of switches S1, and a trailing 01 sequence. The output waveform is a five level staircase approximation to a sine wave which drives speaker SP1 directly. After generating two sequences of the signal shown in FIG. 6, the control unit returns to a quiescent state until reactivated by operating the key S2.

Resistor R1 is a level setting resistor, capacitor C1 provides alternating current bypass control around battery B1. X1 is a 32768 Hz quartz crystal, and SP1 is a 40 ohm speaker. When the key S2 is depressed, the oscillator frequency divided by 1024 (32 Hz) can be observed at pin 6 (TP1) using a high impedance input (10 meg or greater) oscilloscope. Pin 7 (TP2) will display a 1-0 pattern representing the 1024 Hz-683 Hz transmitted code.

The entire circuit for the telephone answering system of FIG. 1 is shown in FIGS. 4A, 4B, 4C and 5. However, only those portions of the circuit concerned with the coded remote control will be described in detail herein.

Figure 4A:
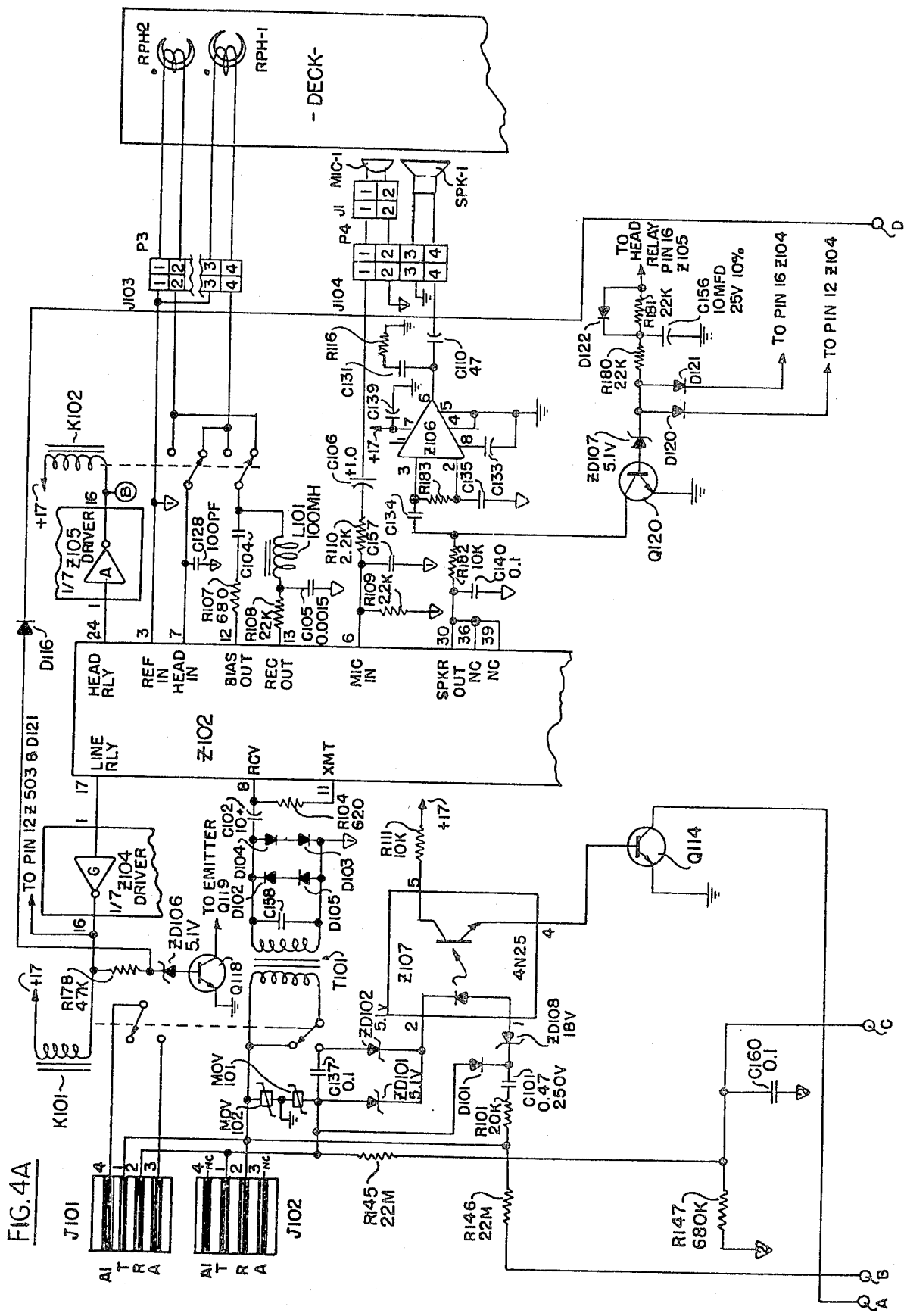
FIGS. 4A, 4B and 4C are schematic circuit diagrams of the electronic circuitry included in the telephone answering system of FIG. 1.
Figure 4B:
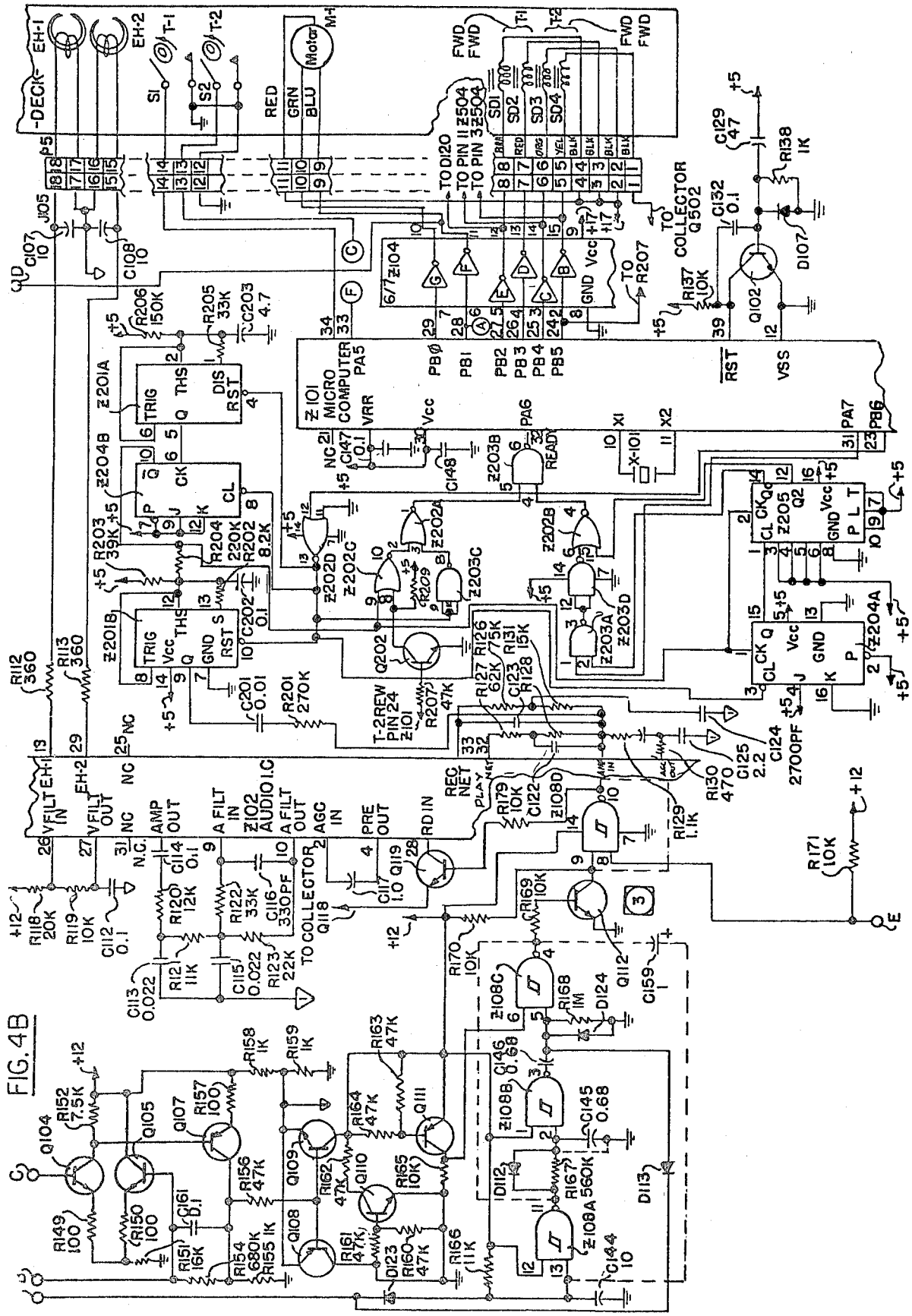
Figure 4C:
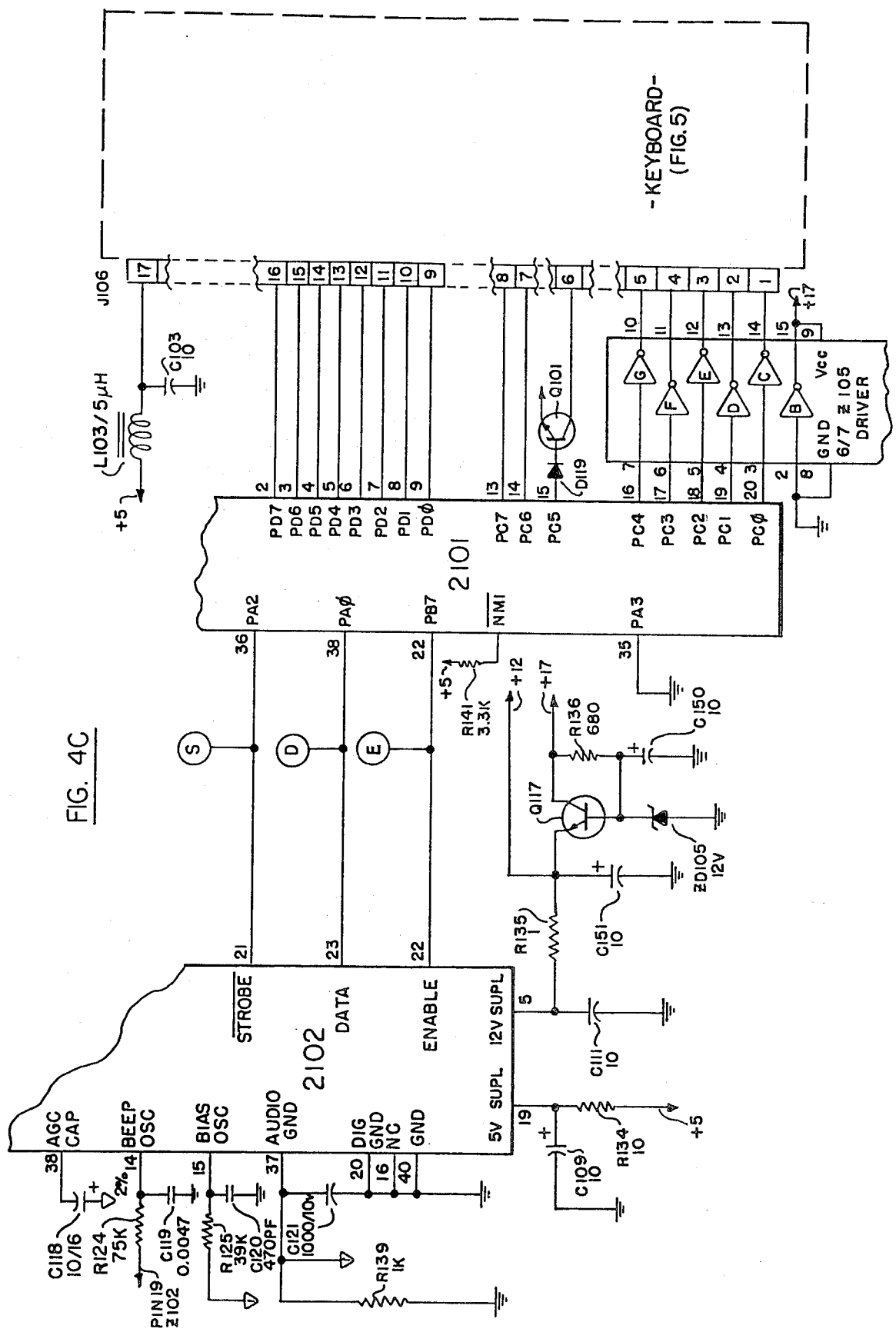

The main logic control for the system, as shown in FIGS. 4A, 4B and 4C is an R6500 8-bit microcomputer Z101, which includes four 8-bit parallel bidirectional ports, 2 kilobytes of read-only memory (ROM), 64 bytes of random access memory (RAM), timers, counters, and an oscillator. The microcomputer runs at a speed of 1 MHz. The 2 MHz frequency of crystal Z101 is divided by two internally, and through the use of "pipelining" provides a faster through-put than other microcomputers running at four times the speed.

Port B (PB0-PB7) of the microcomputer Z101 provides all deck control signals, solenoids, motor, prompt signal control, and the enable signal for an audio chip Z102 which is included in the unit. The microcomputer also includes ports C (PC0-PC7) and D (PD0-PD7) which are used for display and keyboard scanning. Port A (PA0-PA7) is used for communication with the audio chip Z102, 60 Hz poling, communication with the prompt tone circuits, and tape motion sensing. In addition to the functions listed above, microcomputer Z101 performs all counting and timing functions, such as RING SELECT and count, ADJ VOX, set and time, VOX time out, remote detection, and remote code verification.

Audio signal processing is done by the audio integrated circuit Z102, which is a custom integrated circuit. Communication between the microcomputer Z101 and the audio integrated circuit Z102 is by way of enable, strobe and data lines. The communication from the microcomputer is in the form of a serial fed 20-bit word. The word contains control data for the amplifiers, signal pass switches, digital volume control, relay control, erase head drive, speaker muting, and frequency response.

The audio integrated circuit Z102 also contains automatic gain control (AGC) and "audio digitizing" circuitry. The audio is digitized and sent to the microcomputer Z101 (PA0) for such functions as VOX, ring detect and remote detect. Bias and beep tone oscillators are also contained in the audio integrated circuit. Current for the erase heads EH1 and EH2 are provided by the audio integrated circuit Z102 by way of resistors R112 and R113. The unit includes a microphone MIC-1 which may be plugged in for purposes described above, and it also includes a monitoring speaker SPK-1. The unit includes record and playback heads RPH1 and RPH2 for the announcement and message tapes respectively. The unit also includes erase heads EH-1 and EH-2, mentioned above, for the announcement and message tapes respectively. The message tapes are driven by motor M1. The foregoing components are included on the deck of the unit. The unit plugs into the telephone line by appropriate line plugs J101 and J102.

Figure 5:
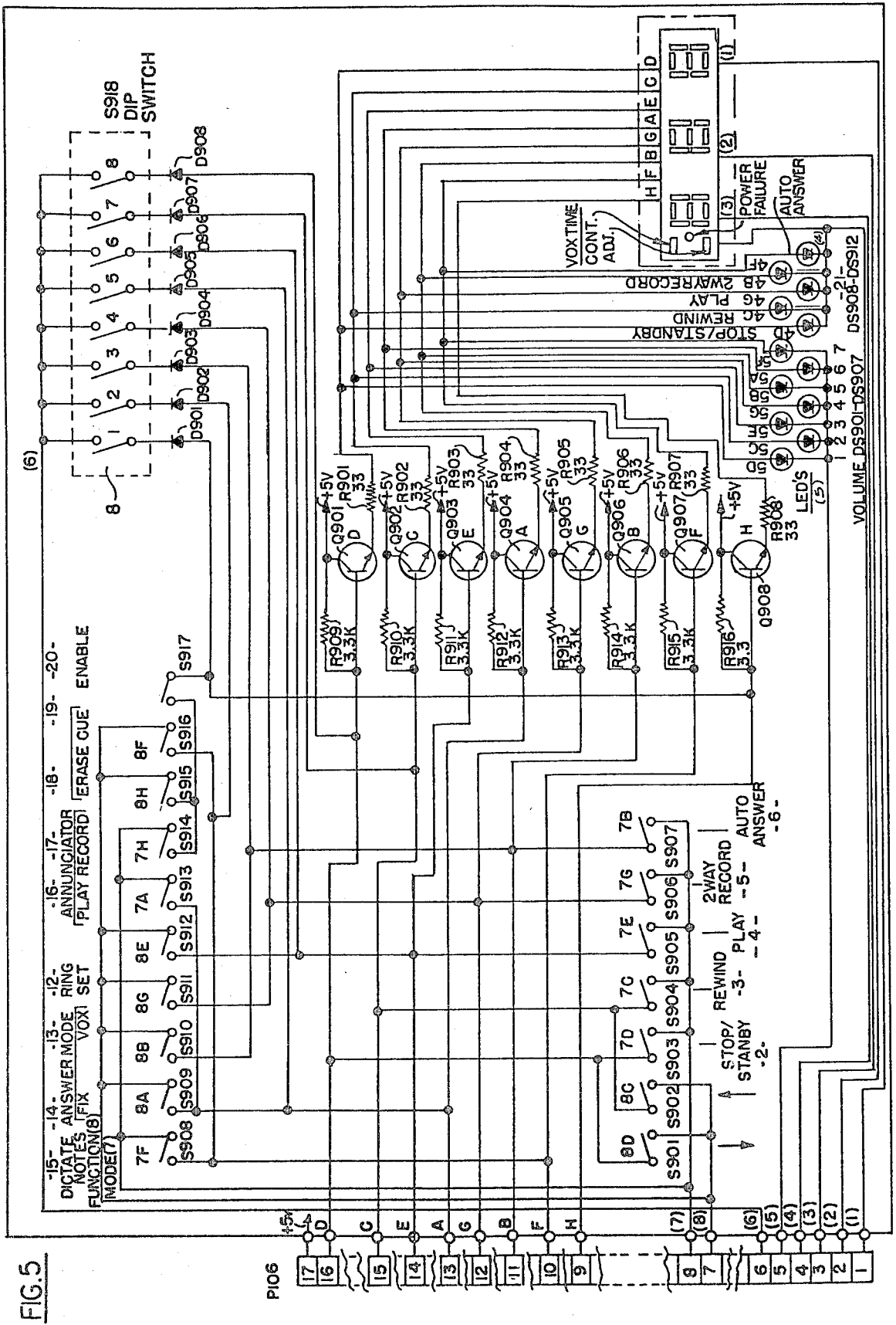
FIG. 5 is a schematic diagram of the electronic circuitry associated with the keyboard of the telephone answering unit of FIG. 1.

The circuitry associated with the keyboard is shown in FIG. 5. As shown in FIG. 5, display 21 includes a "Bargraph" volume indicator (DS901-DS907); mode indicator light emitting diodes (LED's) (DS908-DS912), and a 3-digit seven segment display unit. The display and keyboard are scanned as follows: when "bargraph" information is to be displayed, information is placed on port D (BD0-BD7) of the microcomputer, and port C bit 4 (PC4) is made high (1). Port C bits 0-3 (PC0-PC3) and bit 5 (PC5) are made low (0). Port C bits 6 and 7 (PC6, PC7) are made high (1). When the remote code switches 8 are to be read port D (PD0-PD7) is made high and port C bit 5 (PC5) is made high (1). Port C bits 6 and 7 (PC6, PC7) are made high (1) then port C bits 0-4 (PC0-PC4) are made low (0). The keyboard and display are scanned at 15.625 mS rate. Current sourcing for the LED's is provided by high gain transistors Q901-Q908 and current limiting resistors R901-R908.

The operational description of the integrated circuits included in the system, is as follows. These, for the most part are state-of-the-art MOS integrated circuits.

Z101 RS6500/1 microcomputer (MOS).

Z101 is an 8-bit microprocessor plus 64 bytes of RAM, 2K bytes of ROM, four 8-bit bidirectional ports, counters and timers.

Z102 M273 custom LSI audio and driver (MOS).

Z102, as mentioned above, is a custom part that contains audio amplifiers, AGC, active filters, digital volume attenuators, 2 oscillators, low impedance power source, and active current sinks.

Z103 LM301 operational amplifier (linear).

Z104 Z105 UPA 2001C high current driver (TTL).

Z104 and Z105 are high current (300 mA) inverting drivers.

Z106 LM380N-8 audio power amplifier (linear).

Z106 is an audio power amplifier with 34 dB gain, and 1 watt output capability.

Z201 556 timer (linear).

Z201A is configured as an oscillator. The pulse width and frequency are controlled by R204, R206, and C203.

Z201B is configured as an oscillator. The frequency is controlled by R202, R203, R204, and C202.

Z204 74C76 dual J-K flip-flop (CMOS).

Z204A is configured such that the first negative transition on its clock input (after clear is set high) will cause "Q" to go high (1).

Z204B is configured in a toggle flip-flop mode. Thus every negative transition on its clock input (after clear is set high) will cause "Q" to toggle (1 becomes 0 or 0 becomes 1).

Z205 74C161 synchronous 4-bit binary counter (CMOS).

After clear is set high (1), each positive transition on its clock input will cause the counter to increment. Thus the first positive clock pulse will set Q[2] high (1) and the fourth positive clock pulse will set Q[2] high (1).

Z402 74C164 8-bit serial in-parallel out shift register (CMOS).

Logic levels (0 or 1) on the A and B inputs will be transferred to the Q[A] output upon the positive transition of the strobe (S) input. QA will at that time be shifted to QB; QB to QC; QC to QD; QD to QE; QE to QF; QF to QG.

Z403 74C74 dual "D" flip-flop (CMOS).

At every positive transition of its clock input, the inversion of the logic level (0 or 1) at the "D" input will be transferred to the $\overline{Q}$ output.

Z501 4093 quad "nand" Schmitt trigger.

Z502 4029 Presettable binary up/down counter (CMOS).

When a positive pulse is applied to the "P" input, outputs A, B, C, D are reset to logic 0. If the U/D input is held high (logic 1), the counter will increment at each positive transition of the clock input. If the U/D input is held low (logic 0) the counter will decrement at each positive transition of the clock.

Z503 4068 8-bit input "nand" gate.

Z504 4069 HEX inverter.

During the outgoing announcement, data is fed to the audio integrated circuit Z102 to ENABLE HEAD, PLAY EQ, V FILT, and LINE RLY (off-hook) and to disable REC OUT, BIAS OUT, RD IN, BEEP OSC, HEAD RLY, MIC IN, SPKR OUT, REC EQ, EH-1 and EH-2. Microcomputer lines PB1 and PB2 are made high (1) providing motor drive and T-1 play solenoid operation. Q118 is turned off via ZD106 and D116, forcing RD IN of Z102 high (1). As the announcement tape travels, the audio is digitized by the audio integrated circuit Z102 and fed to the microcomputer Z101 by way of the data line. When the microcomputer senses no activity on the data line for three seconds, the T-1 announcement mode will be terminated, and the T-2 incoming message mode will be initiated.

During the T-2 incoming message mode, data is fed directly to the audio integrated circuit Z102 at the end of the announcement interval T-1 to enable REC EQ, LINE RLY, BIAS OUT, BEEP OSC, REC OUT, SPKR OUT, and EH-2; and to disable EH-1, V FILT, RD IN, HEAD IN, MIC IN, PLAY EQ, and HEAD RLY. Microcomputer lines PB1 and PB4 are made high (1) enabling M1 and SD3. Digitized audio will be sent to the microcomputer Z101 from the audio integrated circuit Z102 on the data line. This data will be examined by the VOX algorithm and T-2 mode will be sustained as long as non-repetitious signals are being received or until maximum time limit has been reached.

Remote detection of signals received from the control unit 25 of FIG. 2 is achieved as follows. The incoming signal (FIG. 6) is digitized by the audio integrated circuit Z102 and sent to the microcomputer Z101 on the data line (PA0). If a valid remote code is received, the microcomputer will send data to the audio integrated circuit to enable PLAY EQ, HEAD IN, LINE RLY and HEAD RLY, and to disable EH-1, EH-2, REC OUT, BIAS OUT, V FILT, RD IN, MIC IN, SPKR OUT, REC EQ, and BEEP OSC.

Microcomputer lines PB1 and PB5 are made high (1) enabling M1 and SD4 causing the T-2 announcement tape to rewind. As the announcement tape is moving, switch S2 on the deck shown in FIG. 4B is opened and closed generating pulses. As long as pulses from S2 are received at the microcomputer (PA5) the unit will remain in rewind and a prompt tone will be sent every three seconds. When the message tape T-2 is rewound, microcomputer lines PB1 and PB4 will be made high (1) energizing motor M1 and SD3 (FIG. 4B) thus placing the unit in the remote playback mode. After all messages have been played, the microcomputer will release the T-2 forward solenoid (PB4) and the unit will go to the T-1 reset mode.

For the T-1 reset mode, data is fed to the audio integrated circuit Z102 to disable all inputs and outputs. Microcomputer lines PB1 and PB3 are made high (1) enabling M1 and SD2 (T-1 rewind) on the deck. These lines will remain high (1) as long as S1 pulses are received at PB4. The S1 pulses are generated by a switch S1 which opens and closes so long as the announcement tape T-1 is moving (see deck of FIG. 4B). When the pulses cease, the telephone answering unit will return to the original answer mode, and is ready to receive subsequent calls.

The features of the system described above, by which a digitally coded signal is transmitted by the remote control unit, and by which access is achieved to the telephone answering unit only when the proper code has been established, is disclosed and claimed in the copending application Ser. No. 301,740. The present invention is concerned with a system whereby messages read over the telephone line to the user may be repeated, if so desired, and by which other particular controls of the telephone answering system are achieved by the remote control unit.

As described above, the detection of the digitally coded signal from the remote control unit is carried out during the $T_2$ mode, by digitizing the incoming signal by the audio integrated circuit Z102, and transmittng the signal to the microcomputer Z101 on the data line (PA0). As also explained, if a valid remote code is received, the microcomputer will send data to the audio integrated circuit so that the message tape may be caused to rewind to its origin position. When the message tape is fully rewound, microcomputer lines PB1 and PB4 become high (1) enabling the motor M1 and solenoid SD3 on the deck of FIG. 4B, thus placing the telephone answering unit in its remote playback mode. As will be described, at the end of each message transmitted over the telephone line to the calling party, the microcomputer will release the T-2 forward solenoid for the message tape, so that the message tape stops. At the same time, the microcomputer outputs a "repeat prompt" signal. If no response is received from the calling party within three seconds, the T-2 remote playback will resume, by PB4 going high. The machine then reads the next message over the telephone line to the calling party. If a response is received over the telephone line, in the form of the digital code signal from the control unit, the message tape of the telephone answering unit will rewind to the beginning of the previous message and then return to the remote playback mode, so that the previous message may again be read over the telephone line.

After all the messages on the message tape have been transmitted over the telephone line during the remote playback mode, the microcomputer Z101 releases the T-2 forward solenoid (PB4) and transmits an "erase prompt". If no response is received within three seconds, the unit will go to the T-1 reset mode described above. If a response is received, in the form of a digitally coded signal from the control unit, the microcomputer will send data to the audio integrated circuit Z102 to enable EH2, and to disable all other inputs and outputs. Microcomputer lines PB1 and PB5 are then made high, (1) enabling M1 and SD4 on the deck in FIG. 4B. The T-2 message tape will then be completely rewound and erased and the messages counter will be reset to 000.

The unique dual tones described above, together with a third unique tone combination, is delivered to the telephone line during remote operation by a prompt tone generator. During rewind, one tone is transmitted over the telephone line every five seconds, to indicate to the calling party that the machine is rewinding the message tape. At the end of each message, a dual tone, one high and one low is transmitted over the telephone line to tell the calling party that he can repeat the last message if he will transmit the digitally coded signal over the line. At the end of all messages, the dual tone, one high and one low, is repeated four times and, if the calling party responds by transmitting the digital code over the telephone line, all messages will be erased from the message tape in the machine, and the tape will be returned to its origin position. During the erasing operation, one tone is transmitted over the telephone line to the calling party. In a constructed embodiment, the high tone is 291 Hz, and the low tone is 260 Hz.

The tone action described above begins when the microcomputer Z101 brings the cue line low (0). The tones are generated by oscillator Z201B, and are fed to the audio integrated circuit Z102 by way of resistor R201 and capacitor C201. The components that determine the low frequency tone are R202, C202 and R203. By effectively paralleling R204 with R203, the high frequency tone is obtained. The components that determine the duration of each tone are Z201A, Z204B, and their associated components. Oscillator Z201A delivers a pulse waveform to toggle flip-flop Z204B. Therefore, the output of flip-flop Z204B is a 1.4 Hz square wave (tone duration=714 microseconds). Q202 provides mode of operation (rewind), and Z204R, Z205, Z202 and Z203 provide tone counting and gating in the following manner:

During rewind, the cue line from the microcomputer goes low (0) activating the prompt circuitry, Q202 is turned on giving a low (0) at one input of "nor" gate Z202C. At the end of the first turn $\overline{Q}$ of Z204B goes low (0), thus causing the output of "nor" gate Z202C to go high (1). This in turn causes the output of "nor" gate Z202A to go low (0), and the output of "nand" gate Z203B to go high (1). The microcomputer sees the "ready" line go high (1) and sets the cue line high (1), thereby resetting the prompt circuit to its inactive state. As long as the microcomputer senses tape motion the above will be repeated every five seconds. In this way, while the message tape is rewinding, a single tone, repeated every five seconds, is transmitted to the calling party.

At the end of each message, the cue line goes low (0) activating the prompt circuitry, the "P DATA" is set high by the microcomputer, and Q202 is turned off, thus keeping one input of Z203B high (1) by way of Z202C and Z202A. At the end of the first tone, Z204A will be clocked (Q=1) and "clear" will be removed from Z205. At the end of the second tone Z205 will be clocked, thus setting Q [0] high (1). Since "P DATA" will be set high (1) at this time, the output of "nand" gate 203A will go low (0), and the output of "nand" gate Z203B will go high (1) by way of Z203D and Z202D, indicating "ready" to the microcomputer. When the foregoing occurs, the microcomputer causes the message tape to rewind to the beginning of the previous message, and then to return to the remote mode, so that the previous message may again be read over the telephone line.

When the telephone answering unit is signalled to enable the erase circuit, for erasing the messages previously recorded on the message tape, by the receipt of the digital coded signal from the remote control unit at the end of all the previously recorded messages, the cue line goes low (0) activating the remote circuitry, "P DATA" is set high by the microcomputer, and Q202 is turned off, thus keeping one input of Z203B high (1) via Z202C, and Z202A. At the end of the first tone, Z204A will be clocked (Q=1) and "clear" will be removed from Z205. At the end of the second tone, Z205 will be clocked, thus setting Q [0] high (1). Since "P DATA" will be low at this time, Z203A output will stay high (1) and Z203D output will stay low. After the two tone cycle is repeated four times, Z205 Q [2] will go high (1). This action causes one input of Z203B to go low (0) via Z202B indicating "ready" to the microcomputer.

During actual erasing, cue line goes low (0) activating the prompt circuitry, Q202 is turned on giving a low (0) at one input of "nor" gate Z202C. At the end of the first tone, $\overline{Q}$ of Z204B goes low (0), thus causing the output of "nor" gate Q202C to go high (1). This in turn causes the output of "nor" gate Z202A to go low (0), and the output of "nand" gate Z203B to go high (1). The microcomputer sees the ready line go high (1) and sets the cue line high (1) thereby resetting the prompt circuit to its inactive state.

The invention provides, therefore, a remote control system for a telephone answering unit, by which messages read over the telephone line to the calling party may be repeated, merely by transmitting the digital code over the telephone line at the end of the message to be repeated. Also, the remote control system of the invention is constructed so that after all messages have been transmitted to the calling party, the calling party may, if so desired, cause the machine to return the message tape to its origin position, and to erase messages previously recorded on the tape.

It will be appreciated that while a particular embodiment of the invention has been shown and described, modifications may be made. It is intended in the following claims to cover all modifications which come within the spirit and scope of the invention.

What is claimed is:

1. A telephone answering system for responding to telephone messages received over a telephone line comprising: a first magnetic tape mechanism having a recorded announcement thereon which is transmitted over the telephone line during a first time interval ($T_1$) in response to a ring signal received over the telephone line, and a second magnetic tape mechanism for recording messages received over the telephone line during a second time interval ($T_2$) following the first interval; audio circuit means adapted to be connected to the telephone line to transmit announcement signals over the telephone line, to receive message signals over the telephone line, to receive a predetermined control signal over the telephone line, and to transmit tone signals over the telephone line; a microcomputer connected to said audio circuit means for generating an output signal upon the receipt of said predetermined control signal; control circuitry connected to said microcomputer and responsive to said output signal for causing said second magnetic tape mechanism to introduce messages recorded thereon successively to said audio circuit means for transmission over the telephone line; tone signal generating circuitry connected to said microcomputer and to said audio circuit means for causing said audio circuit means to transmit distinct tone signals over the telephone line at the end of each of said messages transmitted over the telephone line by said audio circuit means; and further circuitry connected to said audio circuit means and to said control circuitry and responsive to said predetermined control signal received over the telephone line by said audio circuit means within a predetermined time interval after the transmission of said distinctive tone signals over the telephone line at the conclusion of each of said messages to cause said second tape mechanism to rewind an amount equal to the length of the preceding message and then to reintroduce such preceding message to said audio circuit means; and in which said further circuitry causes said control circuitry to cause said second magnetic tape mechanism to introduce the next message to said circuit means in the absence of said predetermined control signal received over said telephone line within said predetermined time interval.

2. The combination defined in claim 1, in which said tone signal generating circuitry causes said audio circuit means to transmit further distinctive tone signals over the telephone line at the end of the transmission of all of the messages recorded on said second magnetic tape mechanism.

3. The combination defined in claim 2, and which includes further circuitry connected to said audio circuit means and to said control circuitry and responsive to a digitally coded signal received over the telephone line within a predetermined time interval after the transmission of said further distinctive tone signals to cause all of the messages on said second magnetic tape mechanism to be erased and said second magnetic tape mechanism to be returned to an origin position.

* * * * *